United States Patent
Zhou

(10) Patent No.: US 8,983,289 B2
(45) Date of Patent: Mar. 17, 2015

(54) TRAINING-ASSISTED CARRIER FREQUENCY AND PHASE RECOVERY IN DIGITAL COHERENT OPTICAL COMMUNICATION SYSTEMS

(71) Applicant: AT&T Intellectual Property I, L.P., Atlanta, GA (US)

(72) Inventor: Xiang Zhou, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 208 days.

(21) Appl. No.: 13/719,375

(22) Filed: Dec. 19, 2012

(65) Prior Publication Data
US 2014/0169784 A1 Jun. 19, 2014

(51) Int. Cl.
*H04B 10/08* (2006.01)
*H04B 17/00* (2006.01)
*H04B 10/06* (2006.01)
*H04B 10/61* (2013.01)

(52) U.S. Cl.
CPC ........ *H04B 10/6164* (2013.01); *H04B 10/6165* (2013.01)
USPC .............................. 398/25; 398/203; 398/204

(58) Field of Classification Search
CPC .................................................. H04B 10/6164
USPC ........................................... 398/25, 204–206
See application file for complete search history.

(56) References Cited

U.S. PATENT DOCUMENTS

| 2005/0123073 | A1* | 6/2005 | Ginesi et al. ................... 375/326 |
| 2011/0103529 | A1* | 5/2011 | Kim et al. ...................... 375/344 |
| 2011/0318021 | A1 | 12/2011 | Zhou |
| 2012/0087680 | A1 | 4/2012 | Xie |
| 2012/0237204 | A1 | 9/2012 | Zhou |
| 2012/0294630 | A1 | 11/2012 | Zhou et al. |
| 2013/0343754 | A1* | 12/2013 | Shellhammer et al. ......... 398/43 |

OTHER PUBLICATIONS

Viterbi et al., "Nonlinear Estimation of PSK-Modulated Carrier Phase with Application to Burst Digital Transmission", IEEE Trans. Inf. Theory, vol. IT-29, No. 4, pp. 543-551 (Jul. 1983).
Hoffmann et al., "Frequency and Phase Estimation for Coherent QPSK Transmission with Unlocked DFB Lasers", IEEE Photonics Technology Letters, vol. 20, No. 18, pp. 1569-1571 (Sep. 2008).
Selmi et al., "Accurate Digital Frequency Offset Estimator for Coherent PolMux QAM Transmission Systems", ECOC, Paper P3.08 pp. 1-2 (Sep. 2009).

(Continued)

*Primary Examiner* — David Payne
*Assistant Examiner* — Casey Kretzer
(74) *Attorney, Agent, or Firm* — Hoffmann & Baron, LLP

(57) ABSTRACT

A method of recovering frequency and phase associated with an optical carrier signal in an optical communication system includes determining an estimated frequency offset based on a starting training sequence, determining a current frequency offset based on the estimated frequency offset and a current phase during steady-state operation of the optical communication system, determining a current frequency based on the current frequency offset, determining an estimated phase using training symbols inserted into the optical carrier signal, and determining the current phase associated with the optical carrier signal based on the estimated phase and a blind phase search algorithm. A corresponding systems and computer-readable device are also disclosed.

18 Claims, 5 Drawing Sheets

(56) References Cited

OTHER PUBLICATIONS

Seimetz, M., "Laser Linewidth Limitations for Optical Systems with High-Order Modulation Employing Feed Forward Digital Carrier Phase Estimation", OTuM2, Proc. OFC/NFOEC, pp. 1-3 (Feb. 2008).

Pfau et al., "Hardware-Efficient Coherent Digital Receiver Concept with Feedforward Carrier Recovery for M-QAM Constellations", Journal of Lightwave Technology, vol. 27, No. 8, pp. 989-999 (Apr. 2009).

Leven et al., "Frequency Estimation in Intradyne Reception", IEEE Photonics Technology Letters, vol. 19, No. 6, pp. 366-368 (Mar. 2007).

* cited by examiner

TRAINING-ASSISTED CARRIER FREQUENCY AND PHASE RECOVERY IN DIGITAL COHERENT OPTICAL COMMUNICATION SYSTEMS

BACKGROUND

1. Technical Field

The present disclosure relates to optical networks, and more specifically relates to a method and apparatus for carrier frequency and phase recovery in digital coherent optical communication systems.

2. Related Art

To meet the growing capacity demands in the core optical network, spectrally efficient techniques, such as digital coherent detection, have recently attracted attention. These techniques allow the use of advanced modulation formats, such as quadrature amplitude modulation (QAM) systems. However, high-order QAM modulation formats, such as QAM formats having an order of four symbols or higher, typically have smaller tolerance for frequency and phase noise because the Euclidian distance decreases. As a result, more robust frequency and phase tracking (i.e., carrier recovery) is typically required. Although frequency and phase tracking can be realized using training-based algorithms, conventional training-based algorithms generally require extra overhead, and thus, reduce the achievable spectral efficiency (SE).

Conversely, blind carrier recovery typically does not require overhead making it more attractive for optical systems. Blind carrier frequency recovery for quadrature phase-shift-keying (QPSK) systems has been widely investigated. Conventional blind carrier frequency recovery in QPSK systems can use an M-th power algorithm to erase the data modulation, after which the frequency offset (between the received signal source and the local oscillator) is determined by the phase rotation speed of the data-erased signal through either fast Fourier transform (FFT)-based methods or time-domain based slope detection methods. FFT-based blind carrier frequency recovery methods have recently been extended from QPSK systems to high-order QAM systems.

A conventional FFT-based carrier frequency recovery method utilizes an Mth-power algorithm to transform the received symbol such that they exhibit a FFT peak at M times the frequency offset. However, for high-order QAMs, only a fraction of data modulation can be erased by the Mth power algorithm. Therefore, an extremely large FFT size is required for reliable and accurate frequency recovery. For example, because the Mth-power algorithm typically only erases the data modulation of a small portion of the symbols for high-order QAM formats, FFT sizes of greater than 8000 are typically required for 64 QAM.

The conventional FFT-based method uses two serially and sequentially implemented FFTs to detect both the frequency magnitude and sign. The level of complexity for such an implementation essentially makes these conventional approaches unrealistic for practical applications. The first FFT estimates the frequency magnitude. The frequency offset of the signal is then "removed" using a guessed sign, and applied to the second FFT. If the second FFT yields a higher frequency offset, then the opposite sign is correct; otherwise, the guessed sign is correct. Though this method is very effective, it not only doubles the computational complexity from one FFT to two FFTs, but it also increases the computational time, as the input of the second FFT depends on the output of the first FFT, and therefore the FFT's cannot be computed in parallel.

Digital phase locked loop (PLL)-based blind carrier recovery algorithms have been widely used in wireless systems to perform simultaneous frequency and phase tracking. However, this type of algorithm cannot typically be used for high-speed optical systems. Unlike wireless systems, in which the change in frequency and phase offsets are relatively similar and slow, the characteristics of frequency and phase offsets in optical systems differ in that the frequency change is relatively slow (in the milliseconds for high-quality laser) but the range can be large (>100 MHz). Additionally, linewidth-related phase noise typically varies quickly when compared to wireless systems (in the nanoseconds) which can result in poor performance of phase lock loop (PLL)-based algorithms due to the intrinsic feedback delay. Furthermore, optical systems typically require parallel processing that further degrades the performance of PLL-based algorithms.

SUMMARY

Embodiments of the disclosure will become apparent from the following detailed description considered in conjunction with the accompanying drawings. It is to be understood, however, that the drawings are designed as an illustration only and not as a definition of the limits of this disclosure.

The disclosure is directed to a method of recovering frequency and phase associated with an optical carrier signal in an optical communication system, which includes determining an estimated frequency offset based on a starting training sequence, determining a current frequency offset based on the estimated frequency offset and a current phase during steady-state operation of the optical communication system, determining a current frequency based on the current frequency offset, determining an estimated phase using training symbols inserted into the optical carrier signal, and determining the current phase associated with the optical carrier signal based on the estimated phase and a blind phase search algorithm.

Determining the current frequency and the current phase may be performed using an optical receiver, and the training symbols may be inserted using an optical transmitter. Determining the estimated frequency offset may include determining the estimated frequency offset using $$\Delta \omega = \frac{\arg\left(\sum_{n=1}^{N-1} \frac{x(n+1)x_{ref}^{-1}(n+1)}{x(n)x_{ref}^{-1}(n)}\right)}{T}, \quad (1)$$

where $\Delta\omega$ represents the estimated frequency offset, $x(n)$ represents a received training symbol received at an nth time slot, $x_{ref}(n)$ represents a transmitted training symbol transmitted at the nth time slot, $x(n+1)$ represents a received training symbol received at an $n+1^{th}$ time slot, $x_{ref}(n+1)$ represents a transmitted training symbol transmitted at the $n+1^{th}$ time slot, T represents a symbol period, and N represents a symbol length. Determining the current phase may include determining an average phase over a phase-varying range centered at the estimated phase, and determining the current frequency may include multiplying the optical carrier signal by $e^{-j\Delta\omega t}$ to remove the current frequency offset. Determining the current frequency offset may include determining the current frequency offset using $$d\omega = \frac{\sum_{n=1}^{N-1}(\theta_{n+1} - \theta_n)}{T}, \tag{3}$$

where $d\omega$ represents the current frequency offset, $\theta_n$ represents phase associated with the optical carrier signal at an nth time slot, and $\theta_{n+1}$ represents phase associated with the optical carrier signal at an $n+1^{th}$ time slot. M known training symbols may be inserted into the optical carrier signal at every N data symbols, where M and N are greater than one, and M may be much less than N. Determining the estimated phase using training symbols may include determining the estimated phase using a maximum likelihood-based phase estimation algorithm.

The disclosure is further directed to an apparatus to recover frequency and phase associated with an optical carrier signal, which includes a processing device, and a memory to store instructions that, when executed by the processing device, perform operations. The operations include determining an estimated frequency offset based on a starting training sequence, determining a current frequency offset based on the estimated frequency offset and a current phase during steady-state operation of the optical communication system, determining a current frequency based on the current frequency offset, determining an estimated phase using training symbols inserted into the optical carrier signal, and determining the current phase associated with the optical carrier signal based on the estimated phase and a constrained blind phase search algorithm over a small phase-varying range that is centered at the estimated phase using the training symbols.

The disclosure is yet further directed to a computer-readable device to store instructions that, when executed by a processing device, perform operations to recover frequency and phase associated with an optical carrier signal, wherein the operations include determining an estimated frequency offset based on a starting training sequence, determining a current frequency offset based on the estimated frequency offset and a current phase during steady-state operation of the optical communication system, determining a current frequency based on the current frequency offset, determining an estimated phase using training symbols inserted into the optical carrier signal; and determining the current phase associated with the optical carrier signal based on the estimated phase and a constrained blind phase estimation algorithm such as a blind phase search algorithm constrained over a small phase varying range.

Embodiments will become apparent from the following detailed description, which is to be read in connection with the accompanying drawings.

BRIEF DESCRIPTION OF THE DRAWINGS

The drawings constitute a part of this disclosure and include examples, which may be implemented in various forms. It is to be understood that in some instances, various aspects of the disclosure may be shown exaggerated or enlarged to facilitate understanding. The teaching of the disclosure can be readily understood by considering the following detailed description in conjunction with the accompanying drawings.

Figure 1:
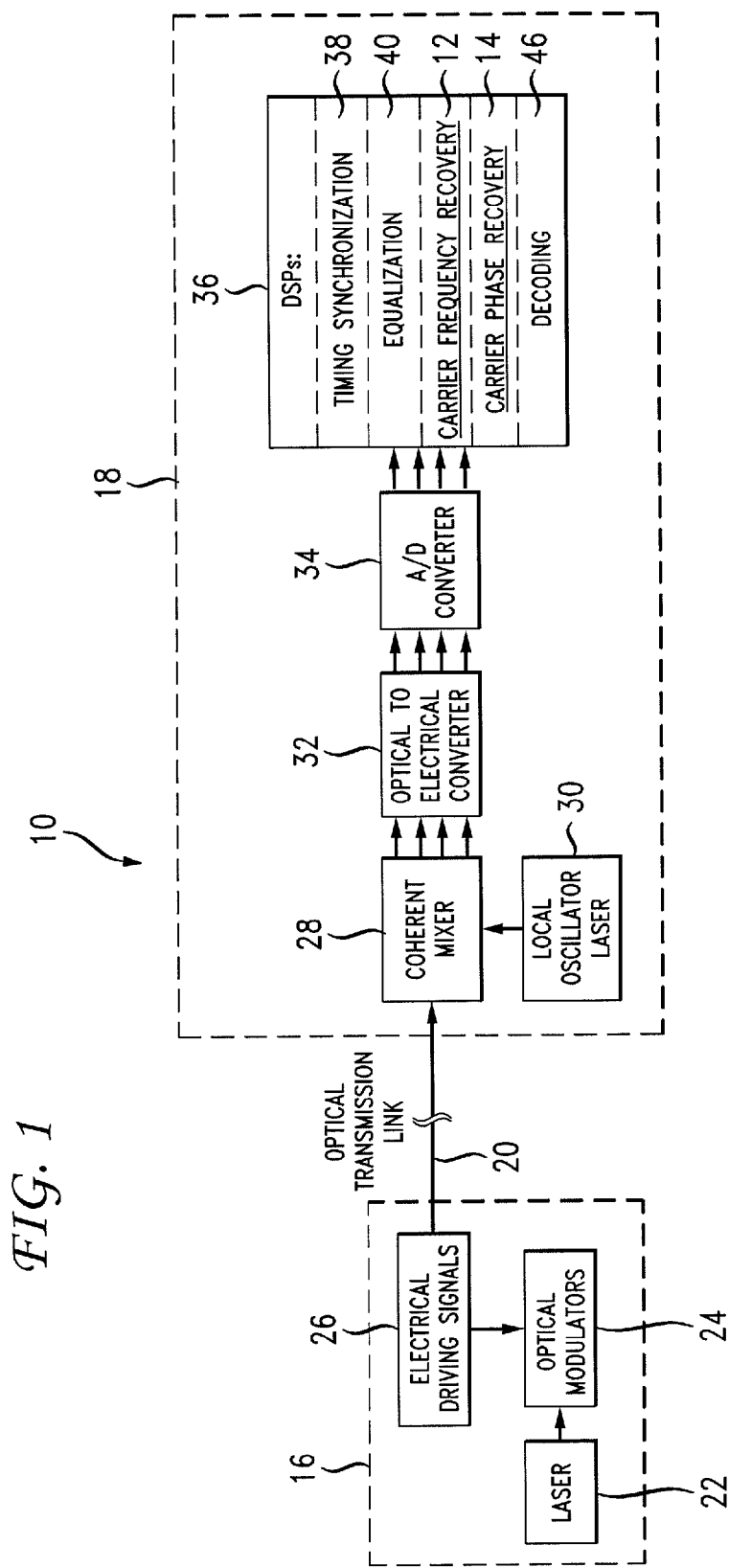
FIG. 1 shows a block diagram of a digital coherent optical communication system.

It is to be appreciated that elements in the figures are illustrated for simplicity and clarity. Common but well-understood elements, which may be useful or necessary in a commercially feasible embodiment, are not necessarily shown in order to facilitate a less hindered view of the illustrated embodiments.

DETAILED DESCRIPTION

Embodiments disclosed herein include methods and systems that perform training-assisted carrier frequency recovery and phase recovery in digital coherent optical communication systems utilizing quadrature amplitude modulation (QAM) formats. In accordance with these embodiments, a slowly-varying signal-local oscillator (LO) frequency offset (FO) is estimated in a hardware-efficient manner by using a starting training sequence to perform initial frequency offset estimation. A recovered carrier phase is then used to track variations in the frequency offset in a feedback configuration, while a carrier phase is estimated using a training-assisted two-stage method. The phase is initially estimated using sparsely-inserted training symbols, and then refined using a blind phase search technique over a small phase-varying range.

The disclosed embodiments utilize a frequency offset estimation method that achieves reliable and accurate frequency offset estimates with significantly lower implementation complexity when compared with the conventional techniques. These embodiments utilize a phase recovery method that uses minimal training overhead, which effectively mitigates cyclic phase shift issues that can result in as much as a 1 dB noise tolerance improvement by removing the need for differential coding and decoding required in conventional optical phase recovery methods. Since this increase in noise tolerance can translate into a transmission reach increase of about 25% for a noise-limited optical communication system, these embodiments are particularly advantageous in 400-Gb/s optical communication system applications and future systems, in which noise tolerance becomes a more challenging issue than current 40 Gb/s and 100 Gb/s systems. These embodiments also provide for a reduction in training overhead in the phase recovery method by utilizing joint phase recovery over two orthogonal polarization states for current polarization-multiplexed transmission systems, joint phase recovery over multiple spatial channels for future space division multiplexed systems, and joint phase recovery over multiple subcarriers in a frequency domain associated with superchannel transmission systems. A superchannel, as used herein, refers to a signal channel that includes multiple subcarriers, wherein each subcarrier is associated with independent data signals. The embodiments disclosed herein are applicable to and experimentally verifiable in 400-Gb/s wavelength division multiplexing (WDM) applications.

The popularity of multimedia communication services over packet data networks, such as the Internet, continues to grow. As a consequence, the demand for higher capacity in core data transport networks is growing. For service providers, core data transport networks include optical networks based on fiber optic technology. To increase the capacity of optical networks, advanced signal modulation techniques, such as quadrature amplitude modulation (QAM) and quadrature phase shift keying (QPSK) are used. In particular, M-ary QAM (M-QAM), such as 16-QAM, 32-QAM, and 64-QAM, enable optical transmissions at high speeds (such as greater than 100 Gb/s) with realizable electrical processing speed, which is typically below 50 GHz, and with high spectral efficiency (such as greater than 2 bit/s/symbol). Digital coherent detection is an effective technique for detecting and demodulating received optical signals. Key steps in digital coherent detection include carrier frequency recovery and phase recovery. Since the transmitter laser and receiver local oscillator are typically derived from independent laser sources, some degree of frequency offset between the transmitter laser source and the local oscillator is common. In addition, this frequency offset will change over time due to changes in temperature, fluctuations in electrical drive current associated with the laser, and the like. In addition, a phase associated with light emitted from the laser sources also typically changes over time due to intrinsic quantum mechanisms.

The time-varying frequency offset and phase offset are estimated and removed at the receiver in order to correctly demodulate the transmitted signal. Such a process is referred to herein as carrier recovery. In contrast with wireless system, in which changes in frequency and phase offsets are relatively similar and gradual, characteristics of frequency and phase offsets in optical systems are very different. For example, frequency offset variations generally occur gradually in optical systems, in the order of milliseconds, for high-quality lasers, but the range can be large, such as greater than 100 MHz, while line width-related phase noise varies quickly when compared with wireless systems, in which laser phase noise varies in the order of nanoseconds.

These characteristics make carrier recovery for high-speed optical systems much more challenging than in wireless system, in which second-order phase-locked-loop (PLL) circuits are generally used to perform simultaneous frequency and phase recovery. For high-speed optical systems, however, phase-locked loop-based recovery techniques perform poorly due to intrinsic feedback delay and a need for a high-degree of parallel processing. Thus, for high-speed optical systems, an independent carrier frequency recovery circuit 12 is used prior to a phase recovery circuit 14 as shown in FIG. 1. FIG. 1 shows a block diagram of a digital signal processing (DSP)-based digital coherent optical communication system 10.

The system 10 includes a transmitter 16 and a receiver 18 operatively coupled by an optical transmission link 20. The transmitter 16 includes a laser source 22 and optical modulators 24, which are coupled to electrical driving signals 26. The optical modulators 24 are coupled to the optical transmission link 20 and the laser source 22.

The receiver 18 includes a coherent mixer 28, which is driven by a local oscillator laser 30, an optical-to-electrical converter 32, an analog-to-digital converter 34, and a digital signal processor 36. The coherent mixer 28 is coupled to the optical transmission link 20 and the local oscillator laser 30. The optical-to-electrical converter 32 is coupled to the coherent mixer 28 and the analog-to-digital converter 34. The digital signal processing circuitry 36 is coupled to the analog-to-digital converter 34, and includes timing synchronization 38, equalization 40, carrier frequency recovery 12, carrier phase recovery 14, and decoding 42 systems. The digital signal processing circuitry 36 is preferably implemented using an application specific integrated circuit, digital signal processor, microprocessor, microcontroller, and/or discrete digital and/or analog circuitry.

Two types of carrier frequency recovery techniques are used for QAM-modulated optical communication systems. The first is an Mth power technique described in A. J. Viterbi and A. M. Viterbi, *"Nonlinear Estimation of PSK-Modulated Carrier Phase with Application to Burst Digital Ttransmission,"* IEEE Trans. Inf. Theory, vol. IT-29, no. 4, July 1983, which is incorporated by reference herein, to erase data modulation and determine the carrier frequency offset from phase rotation speed of a data-erased signal using FFT-based methods described in S. Hoffmann, *Frequency and Phase Estimation for Coherent QPSK Transmission With Unlocked DFB Lasers*, IEEE Photonics Technology Letters, vol. 20, no. 18, Sep. 15, 2008, pp. 1569-1571 and M. Selmi et al, *Accurate Digital Frequency Offset Estimator for Coherent PolMux QAM Transmission Systems*, ECOC '09, Paer p. 3.08, each of which are incorporated by reference herein. However, implementation complexity of these methods is very high, particularly with high-order QAM, since only a small portion of the QAM symbols having equal phase spacing can be used for frequency offset estimation. As a result, a very large FFT size, such as tens of thousands of symbols with 64-QAM, is used for each frequency offset estimate.

In U.S. Publication No. 2012/0294630 entitled Blind Carrier Frequency Offset Detection for Coherent Receivers using Quadrature Amplitude Modulation Formats, which is incorporated herein by reference, a ring-based classification method is used that reduces the required FFT size significantly. However, even with this method, the implementation complexity is still high for high-order QAM, such as 16QAM, 32QAM and 64QAM. For example, an FFT size greater than 500 is required with 64-QAM for each frequency offset estimate. The second type of frequency recovery technique, which is referred to herein as a blind frequency search technique, is described in U.S. Publication No. 2012/0237204 entitled System and Method for Blind Frequency Recovery, which is incorporated by reference herein. This technique scans frequency in two steps; first in a coarse step and then in a refined step. For each trial frequency, this technique calculates a mean square error by using a known signal constellation as a reference, and determines an optimal frequency offset as the frequency offset that yields a minimum mean square error. An advantage of this method is that it requires far fewer symbols, in the order of tens of symbols, than FFT-based methods for reliable frequency offset estimates. Thus, hardware implementation complexity is greatly reduced by using a serial processing implementation with this approach. However, accuracy of the estimated frequency offset may be impacted when using this technique by instantaneous phase noise. Thus, there is a need for improvements in carrier frequency recovery techniques that can achieve reliable and accurate frequency offset estimates with low implementation complexity.

For phase recovery, three different methods are used for QAM-modulated systems. The first is based on a feed-forward Mth power technique using dedicated symbols as described in Seimetz, M., *Laser Linewidth Limitations for Optical Systems with High-Order Modulation Employing Feed Forward Digital Carrier Phase Estimation*, San Diego, Calif.: OTuM2, Feb. 24-28, 2008. Proc. OFC/NFOEC, which is incorporated by reference herein. In this method, data modulation is erased by raising the signal to the Mth power, and the carrier phase is extracted by averaging noise using multiple adjacent symbols. Since only a small portion of the symbols having equal phase spacing can be used for phase estimates in high-order QAM, this method has inherently poor laser phase noise tolerance.

The second method is based on a blind phase search technique (BPS) as described in T. Pfau, S. Hoffmann and R. Noé, *Hardware-Efficient Coherent Digital Receiver Concept With Feed-forward Carrier Recovery for M-QAM Constellations*, Journal of Lightwave Technology, vol. 27, no. 8, Apr. 15, 2009, which is incorporated by reference herein, in which carrier phase is determined by scanning the carrier phase in fine steps and selecting a trial phase to yield a minimum mean square error. Since this method utilizes a feed-forward configuration and involves the current symbols for phase estimates, this method achieves an improved phase noise tolerance when compared with the prior method. However, this method is somewhat more complex since the required number of test phase angles increases with the modulation level.

In U.S. Publication No. 2011/0318021 entitled Feed-Forward Carrier Phase Recovery for Optical Communications, which is incorporated by reference herein, a hybrid BPS and a maximum likelihood (ML) technique are used that can achieve phase noise tolerance similar to the BPS method with a significant reduction in implementation complexity. These techniques, however, all use differential pre-coding at the transmitter and differential decoding at the receiver to mitigate the detrimental impact of cyclic phase shifts, which introduces an undesirable phase jump from 0 to $2\pi$. However, use of differential coding and decoding doubles the symbol error rate, which results in as much as a 1 dB receiver noise sensitivity penalty for an optical communication system utilizing coding-gain soft-decision forward error correction code (FEC), as described in John G. Proakis, *Digital Communications*, third edition, pp. 281, 1995, which is incorporated by reference herein. Thus, an improved phase recovery technique that can remove the need for differential coding and decoding is highly desirable for use in the next generation of high-speed and high-spectral efficiency (SE) optical communication systems, where high-gain FEC is used to counteract signal-to-noise ratio (SNR) requirements associated with the use of high-order QAMs.

The embodiments disclosed herein address the disadvantages discussed above. For frequency recovery, these embodiments provide an initial frequency offset estimate using a starting training sequence and then track the frequency offset variation using the recovered carrier phase angles from the subsequent carry phase recovery circuit in a feedback configuration. For phase recovery, these embodiments sparsely and periodically insert training symbols into a transmitted data stream at the transmitter and then use a two-stage method in the receiver to estimate the carrier phase of the transmitted symbols. The phase is initially estimated using the sparsely-inserted training symbols, which is then refined using a blind phase search technique over a small phase-varying range. This frequency offset estimation technique achieves reliable and accurate frequency offset estimates with low implementation complexity while the phase recovery technique disclosed herein effectively mitigates cyclic phase shift issues without increasing implementation complexity when compared with conventional techniques.

Frequency Recovery

Figure 2:
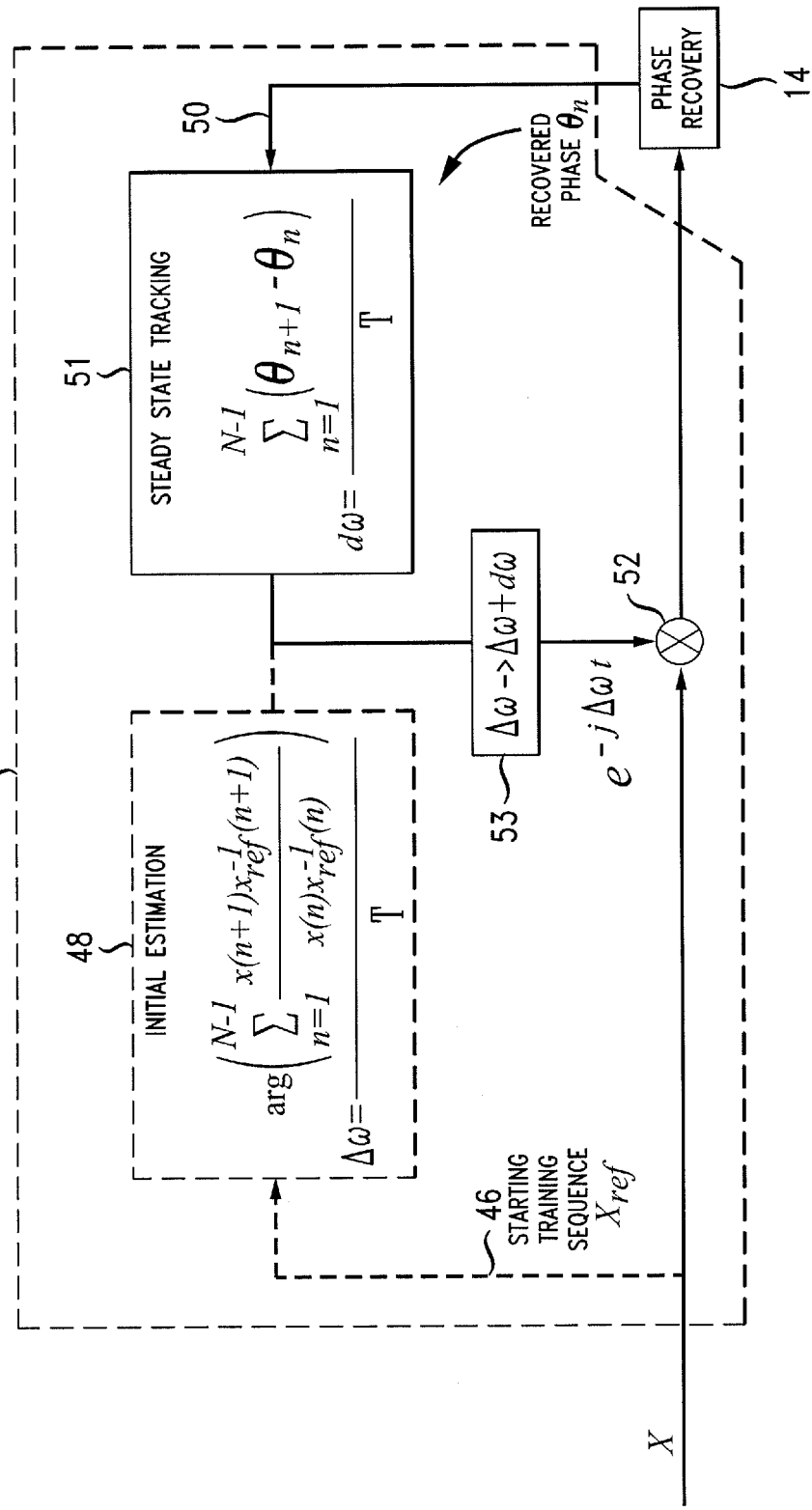
FIG. 2 shows a block diagram of an embodiment of a frequency recovery technique system.

In a majority of coherent optical communication systems, the transmitter sends a starting training sequence to train the receiver before entering into a steady-state operation. This training sequence is primarily used for initial equalizer adaptation as well as time synchronization. However, the embodiments disclosed herein make full use of this starting training sequence to improve carrier frequency recovery as shown in FIG. 2. Based on the starting training sequence 46, a carrier frequency offset $\Delta w$ is initially estimated in an initial estimation element 48 by using a time domain-based differential phase method described in A. Leven, N. Kaneda, U. V. Koc, Y. K. Chen, *Frequency Estimation in Intradyne Reception*, IEEE Photonics Technology Letters, vol. 19, no. 6, pp. 366-368, Mar. 15, 2007 which is incorporated by reference herein, as shown by the following equation:

$$\Delta \omega = \frac{\arg\left(\sum_{n=1}^{N-1} \frac{x(n+1)x_{ref}^{-1}(n+1)}{x(n)x_{ref}^{-1}(n)}\right)}{T}, \quad (1)$$

in which $x(n)$ represents a received starting training symbol at an $n^{th}$ time slot, $x_{ref}(n)$ represents a corresponding sent training symbol at the $n^{th}$ time slot, T represents a symbol period represented in seconds and used for $\Delta w$ extraction, and N represents a symbol length represented in a quantity of filter taps and used for $\Delta w$ extraction. N is equal or less than the training sequence length. The output of the initial estimation element 48 is coupled to a mixer 52, in which the original signal x is multiplied by $e^{-j\Delta\omega t}$ to remove the carrier frequency offset from the original signal x. The output of the mixer 52 is coupled to the carrier phase recovery stage 14. When the system enters steady-state operation, the starting training sequence is not available. At this time, the variation in frequency offset is tracked in steady state tracking elements 51, 53 by using the recovered carrier phase $\theta_n$ 50 from the carrier phase recovery stage 14 in a feedback configuration shown in FIG. 2 and by the following equations:

$$\Delta\omega \rightarrow \Delta\omega + d\omega, \quad (2)$$

and $$d\omega = \frac{\sum_{n=1}^{N-1}(\theta_{n+1} - \theta_n)}{T}, \quad (3)$$

where $\theta_n$ represents the recovered carrier phase of the symbol at the $n^{th}$ time slot. Since carrier frequency typically varies more gradually than symbol speed, which is typically five to six orders of magnitude slower, the extended feedback delay due to parallel processing does not create issues with respect to the frequency recovery method disclosed herein. However, the feed-forward-based-solution is used to estimate carrier phase due to the carrier phase changing more quickly than the frequency drift, and thus feedback-based methods are not suitable for carrier phase recovery in high-speed optical systems.

When compared with conventional FFT-based methods, the method shown in FIG. 2 provides for low implementation complexity since the number of complex multipliers required by this technique, which is a primary indicator of implementation complexity, is significantly lower than that in FFT-based techniques. As shown in FIG. 2, the disclosed method essentially requires no complex multiplier operations for frequency offset estimates in the steady-state operation. In contrast, the FFT-based technique described in U.S. Publication No. 2012/0294630 entitled Blind Carrier Frequency Offset Detection for Coherent Receivers using Quadrature Amplitude Modulation Formats, which is incorporated herein by reference, requires more than 2000 complex multiplier operations for each frequency offset estimate in a 64QAM-modulated system.

Phase Recovery

Figure 3:
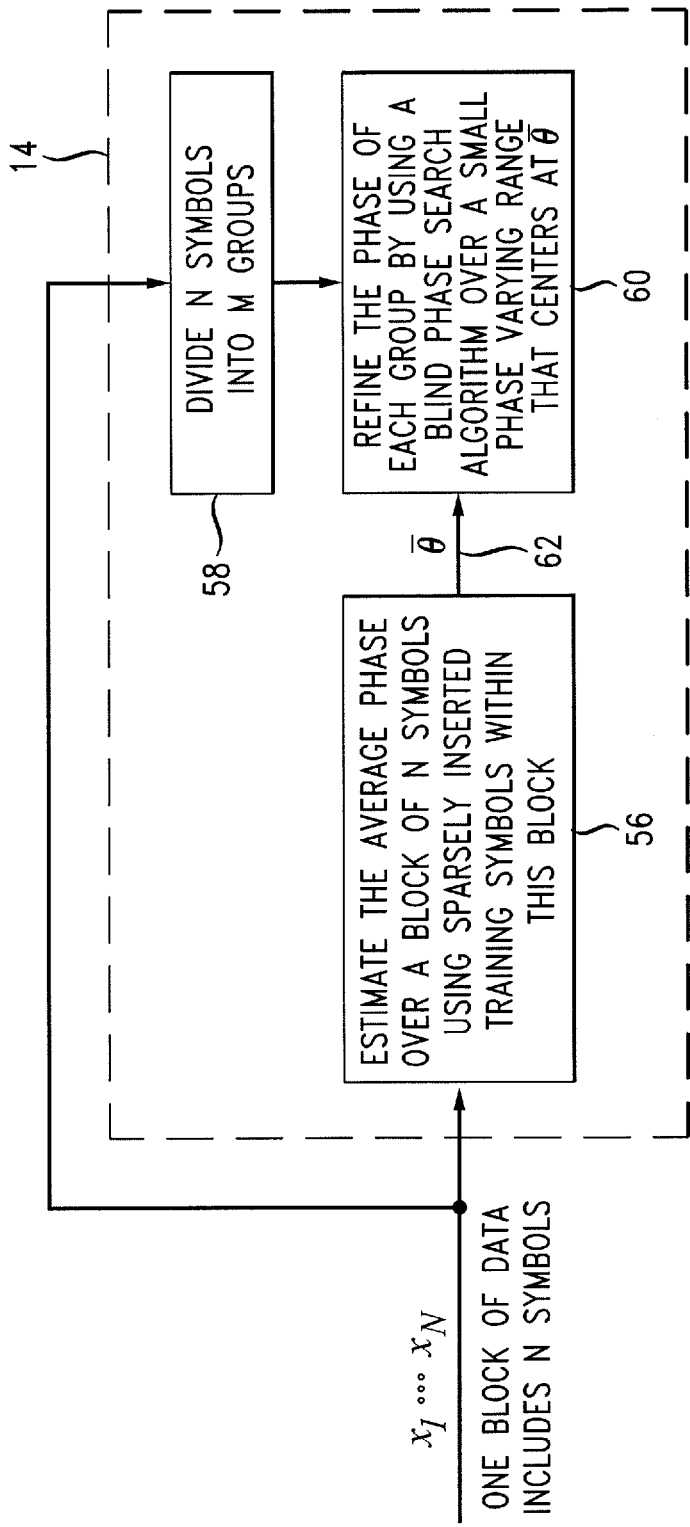
FIG. 3 shows a block diagram of an embodiment of a phase recovery system.

A functional block diagram of an embodiment of the phase recovery technique is shown in FIG. 3. This embodiment is configured in a feed-forward manner to enable straightforward implementation in a parallel processer without sacrificing tracking speed. For this embodiment, training symbols known at the receiver are periodically inserted into the data stream to assist in phase recovery. For example, M known training symbols are inserted into the data stream for every N data symbols, wherein M and N are both greater than one. To reduce training overhead, training symbols are sparsely inserted at the transmitter. That is, the number of training symbols inserted are much less than the number of data symbols during a predetermined period of time. For example, the training overhead is controlled to be approximately 2% or less.

At the receiver, the data is processed block by block, and each block includes at least two training symbols. An allowable data block length for each process is determined by the laser line width, modulation format, and symbol rate. For example, for a 10 Gbaud 64QAM-modulated system using a laser line width of 100 kHz in both the signal source and local oscillator source, a block length of approximately 100 packets is adequate considering both overhead requirements and phase estimation robustness and accuracy. For each block of data, the average phase over the block is estimated in element 56 by using the inserted training symbols utilizing, for example, a maximum likelihood-based phase estimation algorithm as described in U.S. Publication No. 2011/0318021 entitled Feed-Forward Carrier Phase Recovery for Optical Communications, which is incorporated by reference herein. Each block is divided into multiple groups in element 58, and a blind phase search technique as described in T. Pfau, S. Hoffmann and R. Noé., *Hardware-Efficient Coherent Digital Receiver Concept With Feed-forward Carrier Recovery for M-QAM Constellations*, Journal of Lightwave Technology, vol. 27, no. 8, Apr. 15, 2009, which is incorporated by reference herein, is applied within a constrained phase-searching range to refine the phase estimate over each group in element 60. Since such a blind phase search is only applied with a constrained phase-varying range, which centers at the average phase estimated using the training symbols, one can call this technique a constrained blind phase estimation algorithm.

Since phase recovery is applied over a small phase-varying range centered at the average phase 62 estimated using the training symbols the two-stage technique is very robust against cyclic phase shifts and essentially enables elimination of the need for differential coding/decoding, which improves the receiver sensitivity. In terms of implementation complexity and laser phase noise tolerance, the two-stage technique represents an improvement over the hybrid BPS/ML technique described in U.S. Publication No. 2011/0318021 entitled Feed-Forward Carrier Phase Recovery for Optical Communications, which is incorporated by reference herein. However, the implementation complexity is lower than in the BPS technique described in T. Pfau, S. Hoffmann and R. Noé., *Hardware-Efficient Coherent Digital Receiver Concept With Feed-forward Carrier Recovery for M-QAM Constellations*, Journal of Lightwave Technology, Vol. 27, No. 8, Apr. 15, 2009 which is incorporated by reference herein. The cyclic phase shift problem can be solved by using training-based phase recovery. However, this technique requires an unacceptable training overhead, such as 50% or greater, to achieve a close-to-optimal phase noise tolerance. In contrast, the two-stage embodiment disclosed herein achieves comparable performance using a reduced training overhead, which is approximately 2%, without using joint phase recovery over multiple tributaries.

For an optical communication system, in which each signal or channel includes multiple tributaries or multiple sub-channels, these tributaries can be two orthogonal polarization states in a polarization-multiplexed system, different spatial modes in a multi-core/multi-mode fiber used in a space-division-multiplexed system, or different subcarriers in the frequency domain for a superchannel system. The training signal overhead is further reduced by performing joint phase recovery over multiple tributaries, as long as the carriers of all tributaries are derived from a single laser source and all local oscillators are also derived from a single laser source. In this case, only one training symbol may be sent over one block of data or only one training symbol may be sent over multiple blocks of data for each tributary, and the average phase over each block of data can be estimated using the training symbols sent across different tributaries.

The validity of the frequency and phase recovery techniques disclosed herein has been experimentally verified in a 400-Gb/s DWDM system using a time-domain hybrid 32-64QAM format described in Xiang Zhou et al, *12,000 km Transmission of 100 GHz Spaced, 8,495-Gb/s PDM Time-Domain Hybrid QPSK-8QAM Signals*, which is incorporated herein by reference. In this experiment, 16,000 starting training symbols were transmitted for initial equalizer adaptation, timing synchronization, and carrier frequency offset estimation. The variation of carrier frequency offset was tracked using the recovered carrier phase in the embodiments disclosed herein. The results verified that the disclosed embodiment of the frequency offset estimation method reliably and accurately estimates carrier frequency offset for a wide range of operating frequencies from a bit error ratio (BER) of 1e-5 to 4e-2.

For phase recovery, three training symbols were transmitted for every 128 symbols. That is, the data block length was chosen to be 128, and the three training symbols were uniformly distributed across each data block. The three training symbols were used to estimate the average phase over each data block. Each data block was then divided into four groups, with each group including 16 consecutive symbols. Carrier phase over each group was refined by scanning phase over a $\pm\pi/32$ range with a fine phase step of $\pi/64$.

Figure 4A:
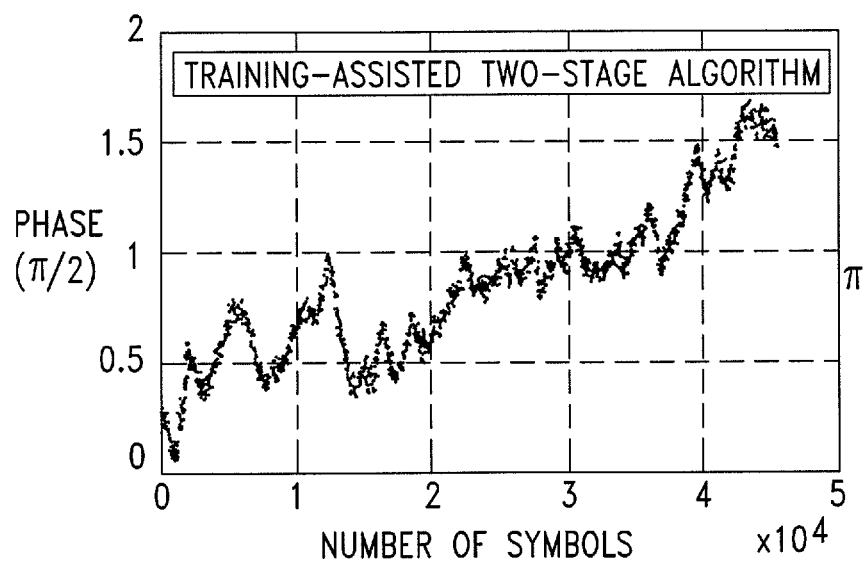
FIG. 4A shows a plot of phase versus a number of symbols for a single-stage blind-phase search technique using with a 400G WDM transmission and a time-domain hybrid PDM-32-64 QAM modulation format.
Figure 4B:
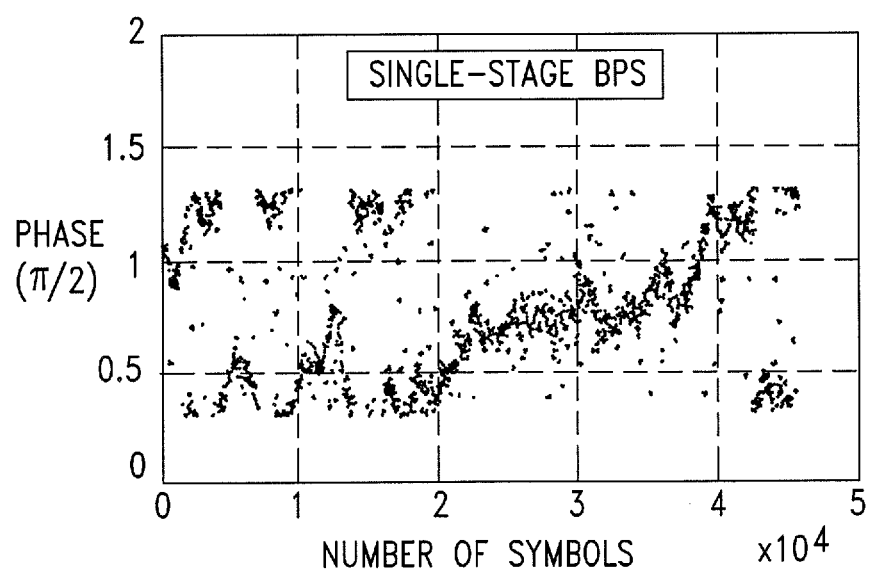
FIG. 4B shows a plot of phase versus number of symbols for an embodiment of a training-assisted two-stage technique using the 400G WDM transmission and the time-domain hybrid PDM-32-64 QAM modulation format referred to in reference to FIG. 4A.

The experimental results show that the phase recovery technique disclosed herein is robust against cyclic phase shifts, which is shown FIG. 4B as a plot of phase versus number of symbols, in which the carrier phases are recovered using the training-assisted two-stage technique disclosed herein. FIG. 4A shows carrier phase recovery as a plot of phase versus number of symbols for the blind phase search technique in a back-to-back measurement with an optical signal-to-noise ratio (OSNR) of 24.2 dB corresponding to a bit error ratio of 2e-2. There was no phase jump when using the training-assisted two-stage technique shown in FIG. 4B, whereas the phase-jump problem was severe when using the single-stage BPS technique shown in FIG. 4A.

High-order QAM and digital coherent detection enable realization of high spectral efficiency optical transmission beyond 100-Gb/s. To be able to correctly detect QAM signals at the receiver side, reliable and accurate carrier frequency and phase recovery are two key steps in a digital coherent receiver. Although several carrier frequency recovery methods have been proposed for high-order QAMs, implementation complexity of these methods is high and can be difficult to realize in high spectral efficiency and high-speed optical systems due to limitations of complementary metal-oxide semiconductor (CMOS) capabilities. The frequency recovery method disclosed herein overcomes this implementation complexity problem by directly tracking the variation of signal-local oscillator frequency offset using the recovered carrier phases from the subsequent phase recovery stage through a hardware-efficient differential phase detection technique in a feedback configuration. This method is applicable to arbitrary QAM and, unlike conventional techniques, its implementation complexity does not increase with modulation levels. These advantages make the embodiments disclosed herein extremely advantageous in 400-Gb/s systems.

The training-assisted two-stage phase recovery method disclosed herein, successfully addresses cyclic phase shift issues using minimal training overhead. In particular, the required training overhead is negligible by performing joint phase recovery over two orthogonal polarization states for current polarization-multiplexed transmission systems, joint phase recovery over multiple spatial channels for future space division multiplexed systems, or joint phase recovery over multiple subcarriers in frequency domain for superchannel transmission systems. Use of this phase recovery method improves the receiver noise tolerance by approximately 1 dB by eliminating the need for differential coding/decoding, which can translate into an approximately 25% increase in transmission reach for a noise-limited transmission system. Moreover, the phase recovery method does not increase implementation complexity when compared with even the most hardware-efficient prior art, and is also applicable to any QAM formats. The generation of transport systems operating at 400 Gb/s and higher per channel data rates are expected to be deployed not only in the United States, but also in Europe and some Asian countries, such as Japan, Korea and China. Thus, the phase recovery method disclosed herein provides many advantages in future 400-Gb/s and beyond transmission systems all over the world.

Figure 5:
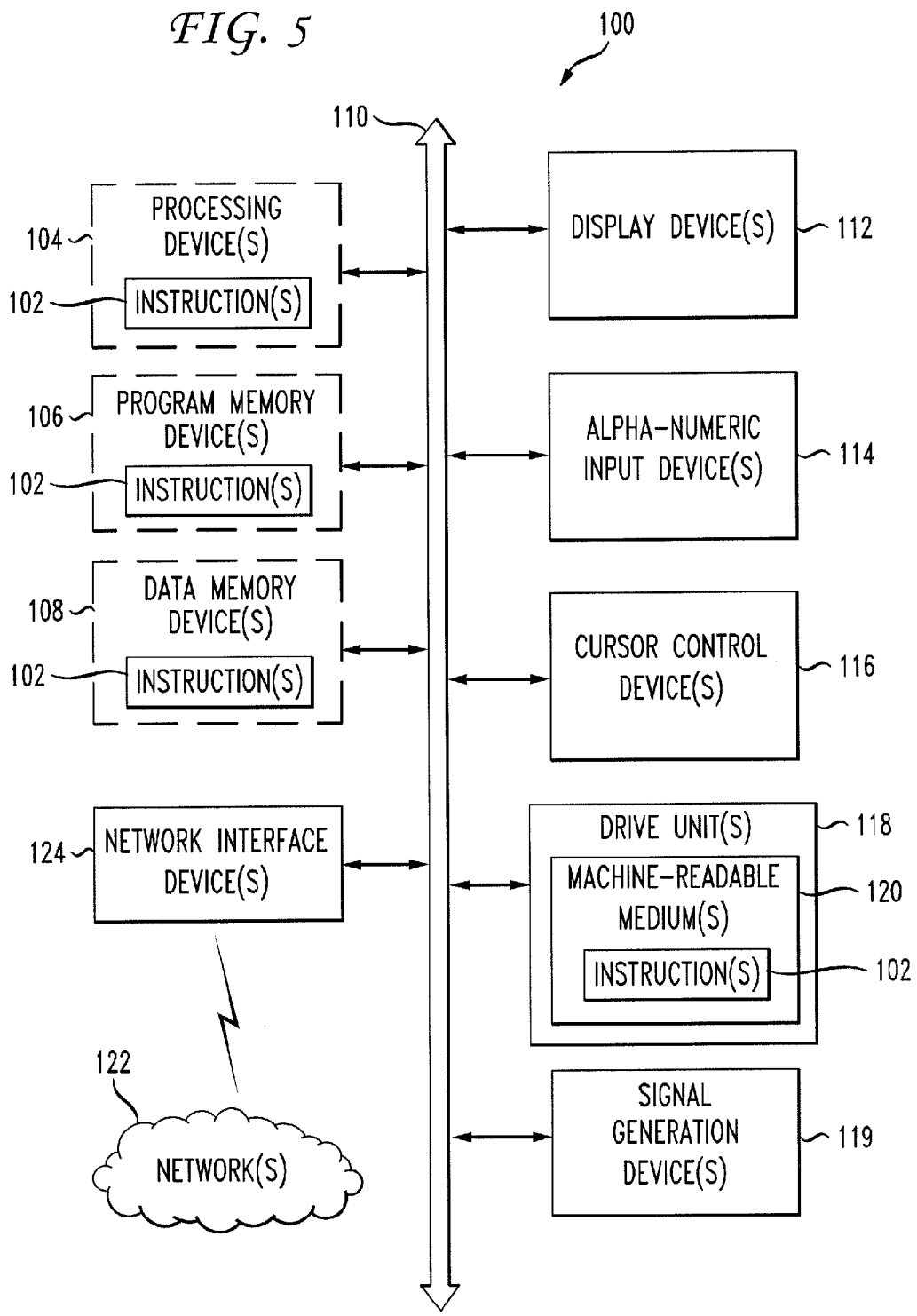
FIG. 5 is a block diagram showing at least a portion of an exemplary machine in the form of a computing system configured to perform methods according to one or more embodiments.

FIG. 5 is a block diagram of an embodiment of a machine in the form of a computing system 100, within which a set of instructions 102, that when executed, may cause the machine to perform any one or more of the methodologies disclosed herein. In some embodiments, the machine operates as a standalone device. In some embodiments, the machine may be connected (e.g., using a network) to other machines. In a networked implementation, the machine may operate in the capacity of a server or a client user machine in a server-client user network environment. The machine may comprise a server computer, a client user computer, a personal computer (PC), a tablet PC, a personal digital assistant (PDA), a cellular telephone, a mobile device, a palmtop computer, a laptop computer, a desktop computer, a communication device, a personal trusted device, a web appliance, a network router, a switch or bridge, or any machine capable of executing a set of instructions (sequential or otherwise) that specify actions to be taken by that machine.

The computing system 100 may include a processing device(s) 104 (e.g., a central processing unit (CPU), a graphics processing unit (GPU), or both), program memory device(s) 106, and data memory device(s) 108, which communicate with each other via a bus 110. The computing system 100 may further include display device(s) 112 (e.g., liquid crystals display (LCD), a flat panel, a solid state display, or a cathode ray tube (CRT)). The computing system 100 may include input device(s) 146 (e.g., a keyboard), cursor control device(s) 116 (e.g., a mouse), disk drive unit(s) 118, signal generation device(s) 119 (e.g., a speaker or remote control), and network interface device(s) 124.

The disk drive unit(s) 118 may include machine-readable medium(s) 120, on which is stored one or more sets of instructions 102 (e.g., software) embodying any one or more of the methodologies or functions disclosed herein, including those methods illustrated herein. The instructions 81 may also reside, completely or at least partially, within the program memory device(s) 106, the data memory device(s) 108, and/or within the processing device(s) 104 during execution thereof by the computing system 100. The program memory device(s) 106 and the processing device(s) 104 may also constitute machine-readable media. Dedicated hardware implementations, not limited to application specific integrated circuits, programmable logic arrays, and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present embodiment contemplates a machine-readable medium or computer-readable medium containing instructions 102, or that which receives and executes instructions 102 from a propagated signal so that a device connected to a network environment 122 can send or receive voice, video or data, and to communicate over the network 122 using the instructions 102. The instructions 102 may further be transmitted or received over a network 122 via the network interface device(s) 124. The machine-readable medium may also contain a data structure for storing data useful in providing a functional relationship between the data and a machine or computer in an illustrative embodiment of the disclosed systems and methods.

While the machine-readable medium 120 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform anyone or more of the methodologies of the present embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the embodiment is considered to include anyone or more of a tangible machine-readable medium or a tangible distribution medium, as listed herein and including art-recognized equivalents and successor media, in which the software implementations herein are stored.

Although the present specification describes components and functions implemented in the embodiments with reference to particular standards and protocols, the disclosed embodiment are not limited to such standards and protocols.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 31 C.F.R. §1.12 (b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

In a particular non-limiting, example embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods, functions or logic described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods, functions or logic described herein.

It should also be noted that software which implements the disclosed methods, functions or logic may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although specific example embodiments have been described, it will be evident that various modifications and changes may be made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

Although preferred embodiments have been described herein with reference to the accompanying drawings, it is to be understood that the disclosure is not limited to those precise embodiments and that various other changes and modifications may be affected herein by one skilled in the art without departing from the scope or spirit of the embodiments, and that it is intended to claim all such changes and modifications that fall within the scope of this disclosure.

What is claimed is:

1. A method of recovering frequency and phase associated with an optical carrier signal in an optical communication system, the method comprising:
    determining, using a processing device, an estimated frequency offset based on a starting training sequence, the estimated frequency offset being associated with the optical carrier signal;
    determining, using the processing device, a current frequency offset based on the estimated frequency offset and a current phase during steady-state operation of the optical communication system, the current frequency offset and the current phase being associated with the optical carrier signal;
    determining, using the processing device, a current frequency based on the current frequency offset, the current frequency being associated with the optical carrier signal;
    determining, using the processing device, an estimated phase using training symbols inserted into the optical carrier signal, the estimated phase being associated with the optical carrier signal; and
    determining, using the processing device, the current phase associated with the optical carrier signal based on the estimated phase and a constrained blind phase estimation algorithm, the current phase being associated with the optical carrier signal, the estimated frequency offset being determined using $$\Delta \omega = \frac{\arg\left(\sum_{n=1}^{N-1} \frac{x(n+1)x_{ref}^{-1}(n+1)}{x(n)x_{ref}^{-1}(n)}\right)}{T}, \quad (1)$$

$\Delta \omega$ representing the estimated frequency offset, x(n) representing a received training symbol received at an $n^{th}$ time slot, $x_{ref}(n)$ representing a transmitted training symbol transmitted at the $n^{th}$ time slot, x(n+1) representing a received training symbol received at an $n+1^{th}$ time slot, $x_{ref}(n+1)$ representing a transmitted training symbol transmitted at the $n+1^{th}$ time slot, T representing a symbol period, N representing a symbol length.

2. The method, as defined by claim 1, wherein determining the current frequency further comprises determining the current frequency using an optical receiver.

3. The method, as defined by claim 1, wherein determining the current phase further comprises determining the current phase using an optical receiver.

4. The method, as defined by claim 1, further comprising inserting the training symbols using an optical transmitter.

5. The method, as defined by claim 1, wherein determining the current phase further comprises determining an average phase over a phase-varying range centered at the estimated phase.

6. The method, as defined by claim 1, wherein determining the current frequency further comprises multiplying the optical carrier signal by $e^{-j\Delta\omega t}$ to remove the current frequency offset, $\Delta \omega$ representing a carrier frequency offset.

7. The method, as defined by claim 1, wherein determining the current frequency offset further comprises determining the current frequency offset using, an instantaneous frequency offset, the instantaneous frequency offset being determined using $$d\omega = \frac{\sum_{n=1}^{N-1}(\theta_{n+1} - \theta_n)}{T}, \quad (3)$$

$d\omega$ representing the instantaneous frequency offset, $\theta_n$ representing phase associated with the optical carrier signal at an $n^{th}$ time slot, $\theta_{n+1}$ representing phase associated with the optical carrier signal at an $n+1^{th}$ time slot, T representing a symbol period.

8. The method, as defined by claim 1, further comprising inserting M known training symbols into the optical carrier signal at every N data symbols, M being greater than one, N being greater than one.

9. The method, as defined by claim 8, wherein M<<N.

10. The method, as defined by claim 1, wherein determining the estimated phase using training symbols further comprises determining the estimated phase using a maximum likelihood-based phase estimation algorithm, determining the current phase further comprising determining the current phase using the estimated phase and a constrained blind phase search algorithm.

11. A system to recover frequency and phase associated with an optical carrier signal, the system comprising:
    a processing device; and
    a storage device storing instructions that, when executed by the processing device, perform operations comprising:
        determining an estimated frequency offset based on a starting training sequence, the estimated frequency offset being associated with the optical carrier signal;
        determining a current frequency offset based on the estimated frequency offset and a current phase during steady-state operation of the optical communication system, the current frequency offset and the current phase being associated with the optical carrier signal;
        determining a current frequency based on the current frequency offset, the current frequency being associated with the optical carrier signal;
        determining an estimated phase using training symbols inserted into the optical carrier signal, the estimated phase being associated with the optical carrier signal; and
    determining the current phase associated with the optical carrier signal based on the estimated phase and a constrained blind phase estimation algorithm, the current phase being associated with the optical carrier signal, the estimated frequency offset being determined using $$\Delta\omega = \frac{\arg\left(\sum_{n=1}^{N-1} \frac{x(n+1)x_{ref}^{-1}(n+1)}{x(n)x_{ref}^{-1}(n)}\right)}{T}, \quad (1)$$

$\Delta\omega$ representing the estimated frequency offset, $x(n)$ representing a received training symbol received at an $n^{th}$ time slot, $x_{ref}(n)$ representing a transmitted training symbol transmitted at the $n^{th}$ time slot, $x(n+1)$ representing a received training symbol received at an $n+1^{th}$ time slot, $x_{ref}(n+1)$ representing a transmitted training symbol transmitted at the $n+1^{th}$ time slot, T representing a symbol period, N representing a symbol length.

12. The system, as defined by claim 11, further comprising an optical receiver, wherein determining the current frequency is performed in the optical receiver.

13. The system, as defined by claim 11, further comprising an optical receiver, wherein determining the current phase is performed in the optical receiver.

14. The system, as defined by claim 11, further comprising an optical transmitter, wherein inserting the training symbols is performed in an optical transmitter.

15. The system, as defined by claim 11, wherein determining the current frequency further comprises multiplying the optical carrier signal by $e^{-j\Delta\omega t}$ to remove the current frequency offset, $\Delta\omega$ representing a carrier frequency offset.

16. The system, as defined by claim 11, wherein determining the current frequency offset further comprises determining the current frequency offset using an instantaneous frequency offset, the instantaneous frequency offset being determined using $$d\omega = \frac{\sum_{n=1}^{N-1}(\theta_{n+1} - \theta_n)}{T}, \quad (3)$$

$d\omega$ representing the instantaneous frequency offset, $\theta_n$ representing phase associated with the optical carrier signal at an $n^{th}$ time slot, $\theta_{n+1}$ representing phase associated with the optical carrier signal at an $n+1^{th}$ time slot, T representing a symbol period.

17. The system, as defined by claim 11, further comprising inserting M known training symbols into the optical carrier signal at every N data symbols, M being greater than one, N being greater than one.

18. A computer-readable device storing instructions that, when executed by a processing device, perform operations to recover frequency and phase associated with an optical carrier signal, the operations comprising:
  determining an estimated frequency offset based on a starting training sequence, the estimated frequency offset being associated with the optical carrier signal;
  determining a current frequency offset based on the estimated frequency offset and a current phase during steady-state operation of the optical communication system, the current frequency offset and the current phase being associated with the optical carrier signal;
  determining a current frequency based on the current frequency offset, the current frequency being associated with the optical carrier signal;
  determining an estimated phase using training symbols inserted into the optical carrier signal, the estimated phase being associated with the optical carrier signal; and
  determining the current phase associated with the optical carrier signal based on the estimated phase and a constrained blind phase estimation algorithm, the current phase being associated with the optical carrier signal, the estimated frequency offset being determined using $$\Delta\omega = \frac{\arg\left(\sum_{n=1}^{N-1} \frac{x(n+1)x_{ref}^{-1}(n+1)}{x(n)x_{ref}^{-1}(n)}\right)}{T}, \quad (1)$$

$\Delta\omega$ representing the estimated frequency offset, $x(n)$ representing a received training symbol received at an $n^{th}$ time slot, $x_{ref}(n)$ representing a transmitted training symbol transmitted at the $n^{th}$ time slot, $x(n+1)$ representing a received training symbol received at an $n+1^{th}$ time slot, $x_{ref}(n+1)$ representing a transmitted training symbol transmitted at the $n+1^{th}$ time slot, T representing a symbol period, N representing a symbol length.

\* \* \* \* \*